(12) United States Patent
Li et al.

(10) Patent No.: US 10,579,856 B2
(45) Date of Patent: Mar. 3, 2020

(54) FINGERPRINT IDENTIFICATION DEVICE, MANUFACTURING METHOD THEREOF, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Ting Li, Beijing (CN); Shan Gao, Beijing (CN); Weiyun Huang, Beijing (CN); Yang Wang, Beijing (CN); Yuanjie Xu, Beijing (CN); Tingliang Liu, Beijing (CN); Zhonglin Cao, Beijing (CN); Pengcheng Zang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 62 days.

(21) Appl. No.: 16/029,073

(22) Filed: Jul. 6, 2018

(65) Prior Publication Data

US 2019/0205601 A1 Jul. 4, 2019

(30) Foreign Application Priority Data

Jan. 3, 2018 (CN) .......................... 2018 1 0004285

(51) Int. Cl.
*G06K 9/00* (2006.01)

(52) U.S. Cl.
CPC .......... *G06K 9/0004* (2013.01); *G06K 9/001* (2013.01)

(58) Field of Classification Search
CPC ............................ G06K 9/0004; G06K 9/001
See application file for complete search history.

(56) References Cited

U.S. PATENT DOCUMENTS

| | | | | |
|---|---|---|---|---|
| 10,114,510 | B2* | 10/2018 | Hoffman | G06F 3/042 |
| 10,365,818 | B2* | 7/2019 | Polishchuk | G06F 3/044 |
| 2008/0029691 | A1* | 2/2008 | Han | G06F 3/04883 |
| | | | | 250/224 |
| 2008/0284925 | A1* | 11/2008 | Han | G06F 3/0425 |
| | | | | 349/12 |
| 2012/0223915 | A1* | 9/2012 | Lin | G06F 3/0416 |
| | | | | 345/175 |
| 2018/0211077 | A1* | 7/2018 | Yoo | G06K 9/001 |
| 2019/0034686 | A1* | 1/2019 | Ling | G06K 9/0004 |
| 2019/0064989 | A1* | 2/2019 | Liu | G06F 3/0325 |
| 2019/0187756 | A1* | 6/2019 | Sun | G06K 9/00087 |

* cited by examiner

*Primary Examiner* — Utpal D Shah
(74) *Attorney, Agent, or Firm* — Brooks Kushman P.C.

(57) ABSTRACT

A fingerprint identification device includes a base substrate, a plurality of photosensitive elements and an elastically deformable layer arranged at a first side of the base substrate, and a backlight source arranged at a second side of the base substrate. A light beam from the backlight source is capable of passing through a gap between two adjacent photosensitive elements toward the elastically deformable layer. The elastically deformable layer is nontransparent in the case of not being pressed by a finger, and capable of being deformed in such a manner as to correspond to valleys and ridges of the finger in the case of being pressed by the finger.

12 Claims, 2 Drawing Sheets

FINGERPRINT IDENTIFICATION DEVICE, MANUFACTURING METHOD THEREOF, AND DISPLAY DEVICE

CROSS-REFERENCE TO RELATED APPLICATION

This application claims priority to Chinese Patent Application No. 201810004285.4 filed on Jan. 3, 2018, which is incorporated herein by reference in its entirety.

TECHNICAL FIELD

The present disclosure relates to the field of fingerprint identification technology, in particular to a fingerprint identification device, a manufacturing method thereof, and a display device.

BACKGROUND

Recently, along with the rapid development of the display technology, display products having a biometric identification function, especially a fingerprint identification function with uniqueness, have attracted more and more attentions.

For a conventional fingerprint identification device, light beams are reflected by valleys and ridges of a fingerprint so as to form reflected light beams at different intensities, and these reflected light beams are received by a photosensitive element so as to generate different induced signals. At this time, the fingerprint identification device may determine the valleys and ridges of the fingerprint, and thereby identify the fingerprint.

However, there are the following defects for the conventional fingerprint identification device. (1) The photosensitive element is intensively irradiated by an ambient light beam for a long time period, so a service life of the fingerprint identification device may be adversely affected. (2) The light beams are reflected by the valleys and the ridges simultaneously, so the identification accuracy of the conventional fingerprint identification device is relatively low.

SUMMARY

In one aspect, the present disclosure provides in some embodiments a fingerprint identification device, including a base substrate, a plurality of photosensitive elements arranged at a first side of the base substrate and spaced apart from each other, an elastically deformable layer arranged at a side of the plurality of photosensitive elements away from the base substrate, and a backlight source arranged at a second side of the base substrate opposite to the first side. A light beam from the backlight source is capable of passing through a gap between two adjacent photosensitive elements toward the elastically deformable layer. The elastically deformable layer is nontransparent in the case of not being pressed by a finger, and capable of being deformed in such a manner as to correspond to valleys and ridges of the finger in the case of being pressed by the finger. A portion of the elastically deformable layer corresponding to each ridge is thinned and becomes transparent after being pressed, so that the light beam from the backlight source is received and reflected by the ridge toward the corresponding photosensitive element. A portion of the elastically deformable layer corresponding to each valley is capable of absorbing the light beam from the backlight source. The photosensitive element is configured to generate an induced signal in accordance with the received light beam.

In a possible embodiment of the present disclosure, the elastically deformable layer includes a colored liquid and a transparent elastic membrane enclosing the colored liquid. When the elastically deformable layer is pressed by the finger, a portion of the colored liquid at a position corresponding to each ridge is pushed away, so that the light beam from the backlight source is received and reflected by the ridge toward the corresponding photosensitive element. The portion of the colored liquid at a position corresponding to each valley is capable of absorbing the light beam from the backlight source.

In a possible embodiment of the present disclosure, the colored liquid is colored ink.

In a possible embodiment of the present disclosure, the elastic membrane is a polyurethane (PU) membrane, a casting polypropylene (CPP) membrane, or a biaxially-oriented polyethylene terephthalate (BOPET) membrane.

In a possible embodiment of the present disclosure, the elastic membrane has a thickness smaller than or equal to 20 µm.

In a possible embodiment of the present disclosure, the fingerprint identification device further includes a light-shielding layer arranged between each photosensitive element and the backlight source, and an orthogonal projection of each photosensitive element onto the base substrate is located within an orthogonal projection of the light-shielding layer onto the base substrate.

In a possible embodiment of the present disclosure, the fingerprint identification device further includes a power source connected to the backlight source.

In a possible embodiment of the present disclosure, the fingerprint identification device further includes an identification module connected to each photosensitive element and configured to receive the induced signal generated by the photosensitive element and generate a fingerprint pattern in accordance with the induced signal.

In another aspect, the present disclosure provides in some embodiments a display device including the above-mentioned fingerprint identification device.

In yet another aspect, the present disclosure provides in some embodiments a method for manufacturing the above-mentioned fingerprint identification device, including steps of: providing a base substrate; and forming a plurality of photosensitive elements spaced apart from each other at a first side of the base substrate, forming an elastically deformable layer at a side of each photosensitive element away from the base substrate, and forming a backlight source at a second side of the base substrate opposite to the first side.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
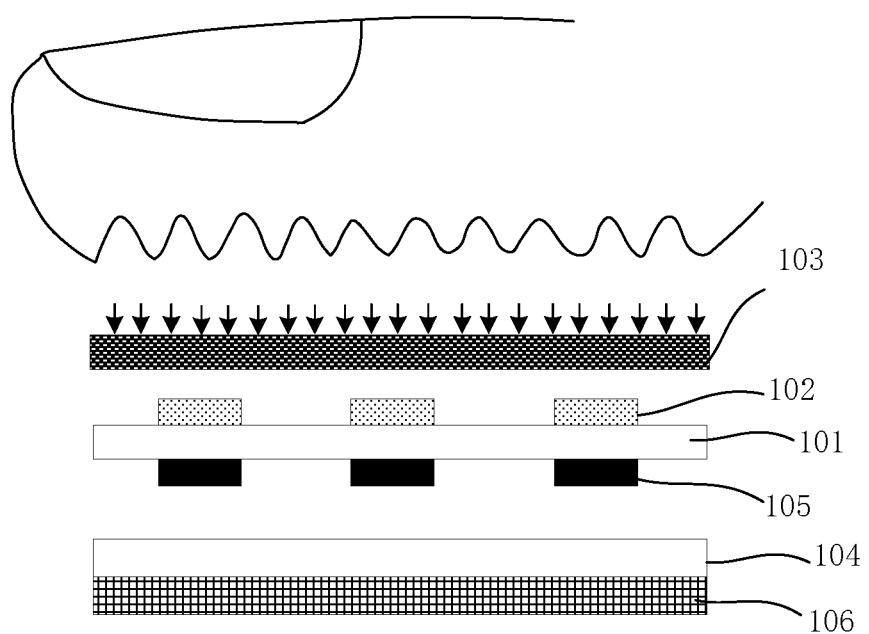
FIG. 1 is a schematic view showing a fingerprint identification device in the case of not being pressed by a finger according to one embodiment of the present disclosure.
Figure 2:
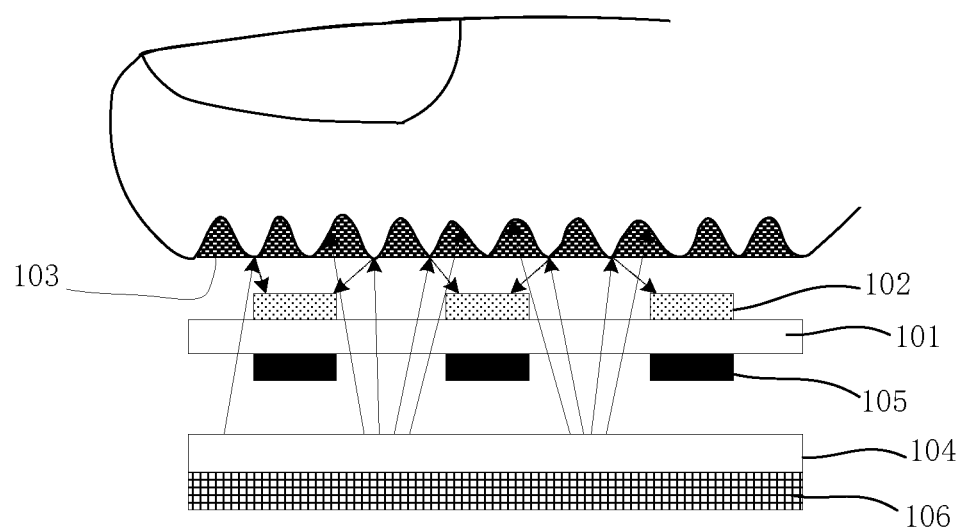
FIG. 2 is a schematic view showing the fingerprint identification device in the case of being pressed by the finger according to one embodiment of the present disclosure.

As shown in FIGS. 1 and 2, the present disclosure provides in some embodiments a fingerprint identification device, which includes a base substrate 101, a plurality of photosensitive elements 102 arranged at a first side of the base substrate 101 and spaced apart from each other, an elastically deformable layer 103 arranged at a side of each photosensitive element 102 away from the base substrate 101, and a backlight source 104 arranged at a second side of the base substrate 101 opposite to the first side.

Referring to FIG. 1, the elastically deformable layer 103 is nontransparent in the case of not being pressed by a finger, so it is capable of absorbing an ambient light beam (indicated by a down arrow in FIG. 1). In this way, it is able to prevent the ambient light beam from irradiating each photosensitive element 102, thereby to prolong a service life of the fingerprint identification device.

Referring to FIG. 2, the elastically deformable layer 103 is capable of being deformed in such a manner as to correspond to valleys and ridges of the finger in the case of being pressed by the finger. A portion of the elastically deformable layer 103 corresponding to each ridge is thinned and becomes transparent after being pressed, so that the light beam from the backlight source 104 is reflected by the ridge toward the corresponding photosensitive element 102. A portion of the elastically deformable layer 103 corresponding to each valley is capable of absorbing the light beam from the backlight source 104, so no light beam is reflected by each valley. In addition, the ambient light beam is also absorbed by the portion of the elastically deformable layer 103 corresponding to each valley. In this way, it is able to prevent the fingerprint identification accuracy from being adversely affected by the light beam reflected by the valleys and the ambient light beam, thereby to improve the fingerprint identification effect. In FIG. 2, a solid line with an arrow represents the light beam from the backlight source 104, and a dotted line with an arrow represents the light beam reflected by each ridge of the fingerprint.

In a possible embodiment of the present disclosure, the elastically deformable layer 103 may be of various structures, as long as the above-mentioned function may be achieved.

In a possible embodiment of the present disclosure, the elastically deformable layer includes a colored liquid and a transparent elastic membrane enclosing the colored liquid. In the case that the elastically deformable layer is not pressed by the finger, the color liquid is distributed evenly in the elastically deformation layer, so the elastically deformable layer is nontransparent and capable of absorbing the ambient light beam. In this way, it is able to prevent the ambient light beam from irradiating the photosensitive elements, thereby to prolong the service life of the fingerprint identification device. In the case of being pressed by the finger, the elastically deformable layer may be deformed in such a manner as to correspond to the valleys and ridges of the fingerprint. At this time, a portion of the colored liquid at a position corresponding to each ridge may be pushed away and only transparent elastic membrane is left, so that the light beam from the backlight source may be received and reflected by the ridge toward the corresponding photosensitive element. In addition, the colored liquid remains in the elastically deformable layer at the position corresponding to each valley, so the light beam from the backlight source may be absorbed by the colored liquid, i.e., no light beam may be reflected by the valleys. Further, the ambient light beam may also be absorbed by the color liquid in the elastically deformable layer at the position corresponding to each valley, so it is able to prevent the fingerprint identification accuracy from being adversely affected by the light beam reflected by the valleys and the ambient light beam, thereby to improve the fingerprint identification effect.

In a possible embodiment of the present disclosure, the colored liquid may be colored ink. A color of the colored ink may be selected in accordance with the practical need, so as to improve the appearance of the product and meet the customer's requirement, thereby to improve the competitiveness of the product. For example, the colored ink may be black, so as to improve its light-absorbing effect.

In a possible embodiment of the present disclosure, the elastic membrane may be made of various elastic, transparent materials. For example, the elastic membrane may be a PU membrane, a CPP membrane or a BOPET membrane, so as to provide excellent elasticity, temperature tolerance, mechanical strength and transparency with a thickness of smaller than 20 μm. In the case of being pressed by the finger, it is able for the elastic membrane to be deformed significantly under a relatively small external stress. In the case that the finger moves away and no external stress is applied, it is able for the elastic membrane to restore its original shape under a stress generated by the colored liquid and a stress generated by the elastic membrane itself.

Referring to FIGS. 1 and 2, the fingerprint identification device may further include a light-shielding layer 105 arranged between each photosensitive element 102 and the backlight source 104, and an orthogonal projection of each photosensitive element 102 onto the base substrate 101 is located within an orthogonal projection of the light-shielding layer 105 onto the base substrate 101. An area of the orthogonal projection of the light-shielding layer 105 onto the base substrate 101 may be greater than or equal to an area of the orthogonal projection of the photosensitive element 102 onto the base substrate 101. The light-shielding layer 105 may be arranged between each photosensitive element 102 and the backlight source 104, so as to prevent the light beam from the backlight source 104 from irradiating the photosensitive element 102.

Figure 3:
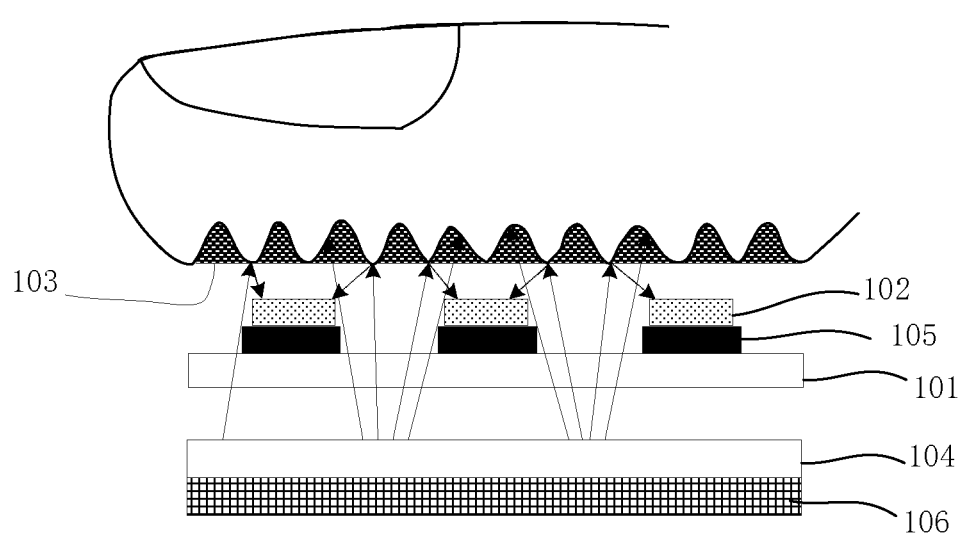
FIG. 3 is another schematic view showing the fingerprint identification device in the case of being pressed by the finger according to one embodiment of the present disclosure.

In a possible embodiment of the present disclosure, the light-shielding layer 105 may be arranged at the second side of the base substrate 101. In another possible embodiment of the present disclosure, as shown in FIG. 3, the light-shielding layer 105 may also be arranged at the first side of the base substrate 101 and between the base substrate 101 and the photosensitive element 102.

Referring to FIGS. 1 and 2, the fingerprint identification device may further include a power source 106 connected to the backlight source 104 and configured to supply power to the backlight source 104.

In order to achieve the fingerprint identification function, the fingerprint identification device may further include an identification circuitry connected to the photosensing elements, and configured to receive the induced signal generated by the photosensitive element and generate a fingerprint pattern in accordance with the induced signal.

The present disclosure further provides in some embodiments a display device including the above-mentioned fingerprint identification device. The display device may be a mobile phone or a flat-panel computer.

The present disclosure further provides in some embodiments a method for manufacturing the above-mentioned fingerprint identification device, which includes: providing a base substrate; and forming a plurality of photosensitive elements spaced apart from each other at a first side of the base substrate, forming an elastically deformable layer at a side of each photosensitive element away from the base substrate, and forming a backlight source at a second side of the base substrate opposite to the first side.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A fingerprint identification device, comprising a base substrate, a plurality of photosensitive elements arranged at a first side of the base substrate and spaced apart from each other, an elastically deformable layer arranged at a side of the plurality of photosensitive elements away from the base substrate, and a backlight source arranged at a second side of the base substrate opposite to the first side, wherein a light beam from the backlight source is capable of passing through a gap between two adjacent photosensitive elements toward the elastically deformable layer;

the elastically deformable layer is nontransparent in the case of not being pressed by a finger, and capable of being deformed in such a manner as to correspond to valleys and ridges of the finger in the case of being pressed by the finger;

a portion of the elastically deformable layer corresponding to each ridge is thinned and becomes transparent after being pressed, so that the light beam from the backlight source is received and reflected by the ridge toward the corresponding photosensitive element;

a portion of the elastically deformable layer corresponding to each valley is capable of absorbing the light beam from the backlight source; and the photosensitive element is configured to generate an induced signal in accordance with the received light beam.

2. The fingerprint identification device according to claim 1, wherein the elastically deformable layer comprises a colored liquid and a transparent elastic membrane enclosing the colored liquid;

when the elastically deformable layer is pressed by the finger, a portion of the colored liquid at a position corresponding to each ridge is pushed away, so that the light beam from the backlight source is received and reflected by the ridge toward the corresponding photosensitive element; and the portion of the colored liquid at a position corresponding to each valley is capable of absorbing the light beam from the backlight source.

3. The fingerprint identification device according to claim 2, wherein the colored liquid is colored ink.

4. The fingerprint identification device according to claim 2, wherein the elastic membrane is a polyurethane (PU) membrane, a casting polypropylene (CPP) membrane, or a biaxially-oriented polyethylene terephthalate (BOPET) membrane.

5. The fingerprint identification device according to claim 2, wherein the elastic membrane has a thickness smaller than or equal to 20 μm.

6. The fingerprint identification device according to claim 1, further comprising a light-shielding layer arranged between each photosensitive element and the backlight source, wherein an orthogonal projection of each photosensitive element onto the base substrate is located within an orthogonal projection of the light-shielding layer onto the base substrate.

7. The fingerprint identification device according to claim 1, further comprising a power source connected to the backlight source.

8. The fingerprint identification device according to claim 1, further comprising an identification circuitry connected to each photosensitive element, and configured to receive the induced signal generated by the photosensitive element and generate a fingerprint pattern in accordance with the induced signal.

9. The fingerprint identification device according to claim 3, wherein the colored ink is black ink.

10. The fingerprint identification device according to claim 1, further comprising a light-shielding layer arranged between each photosensitive element and the base substrate, wherein an orthogonal projection of each photosensitive element onto the base substrate is located within an orthogonal projection of the light-shielding layer onto the base substrate.

11. A display device, comprising the fingerprint identification device according to claim 1.

12. A method for manufacturing the fingerprint identification device according to claim 1, comprising steps of:

providing a base substrate;

forming a plurality of photosensitive elements spaced apart from each other at a first side of the base substrate;

forming an elastically deformable layer at a side of each photosensitive element away from the base substrate; and forming a backlight source at a second side of the base substrate opposite to the first side.

\* \* \* \* \*